April 27, 1965     M. W. KUCHENBECKER     3,180,554

TRAY

Filed Jan. 17, 1963     3 Sheets-Sheet 1

INVENTOR.
MORRIS W. KUCHENBECKER
BY
ATTORNEY

April 27, 1965 M. W. KUCHENBECKER 3,180,554
TRAY
Filed Jan. 17, 1963 3 Sheets-Sheet 2

INVENTOR.
MORRIS W. KUCHENBECKER
BY
ATTORNEY

April 27, 1965  M. W. KUCHENBECKER  3,180,554
TRAY

Filed Jan. 17, 1963  3 Sheets-Sheet 3

INVENTOR.
MORRIS W. KUCHENBECKER
BY *Florian H. Jabas*
ATTORNEY

United States Patent Office 3,180,554
Patented Apr. 27, 1965

3,180,554
TRAY
Morris W. Kuchenbecker, Neenah, Wis., assignor to American Can Company, New York, N.Y., a corporation of New Jersey
Filed Jan. 17, 1963, Ser. No. 252,099
2 Claims. (Cl. 229—28)

This invention relates to multi-compartment trays. More specifically, the invention relates to tapered trays having a plurality of receptacle portions, particularly suitable for packaging bakery products, which can be readily set up by automatic machinery and shipped in stacked and nested form.

Divided or compartmented trays customarily have vertical sides and a unitary bottom panel coextensive with the area defined by the outer sides of the tray. Such a construction makes it impossible to ship erected divided trays in a stacked or nested form to save space. Even if the sides of the tray are tapered, the full bottom prevents nesting of the carton. Therefore the trays are usually shipped in the form of collapsed blanks to the product packager, who erects or sets up the trays. The setting up of the trays requires either a substantial labor cost or a capital expenditure for tray erection equipment.

Further, the formation of a divided tray from a unitary blank or several blanks is usually quite involved, and the resulting tray often lacks rigidity. When used in the baking industry, it is extremely desirable that the tray be suitable for baking of the product therein. The construction should be such that dough can be deposited in individual pockets or compartments, which are of sufficient rigidity to maintain their shape during expansion of the dough while baking. From the standpoint of ease of erection, rigidity of construction and lower investment cost to the packager, it is desirable to provide a tapered tray construction which has increased rigidity due to separate pockets or compartments, and which allows nesting of the tray in a stack of other substantially identical trays.

It is therefore an object of the present invention to provide a divided tray, having tapered compartments or pockets, which is suitable for stacking in a nested condition.

A further object of the present invention is to provide a divided tray suitable for baking wherein the compartments or pockets retain their original shape throughout the baking of products located therein.

Yet another object of the present invention is to provide a divided tray wherein no one compartment has a side wall or bottom common to another compartment and shifting of product from one compartment to another is avoided.

Another object of the present invention is to provide a tray which readily can be set up on automatic machinery.

Further details, advantages and objects will be apparent from the following specification and appended drawings wherein.

Figure 1:
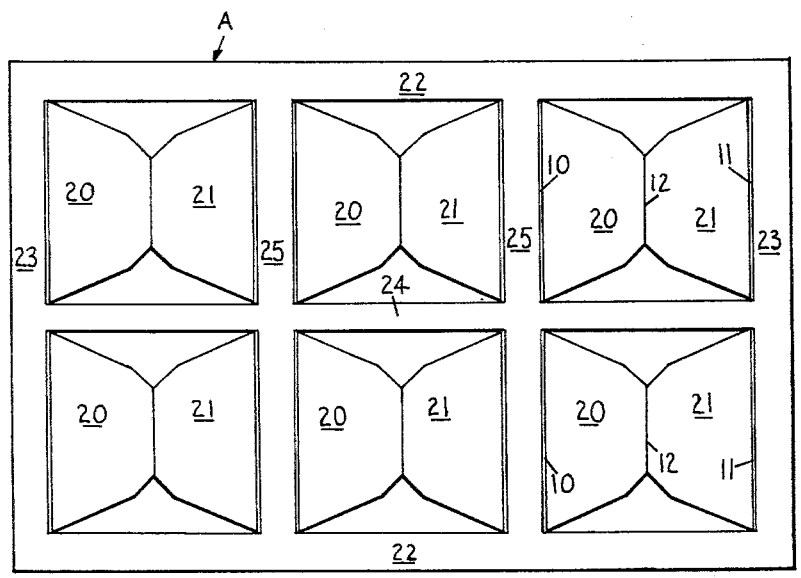
FIGURE 1 is a plan view of a female tray forming blank.
Figure 3:
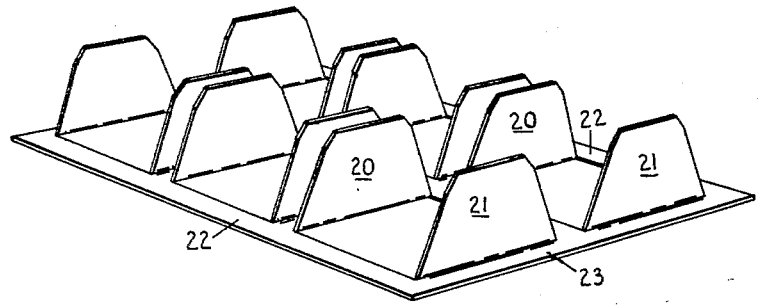
Figure 2:
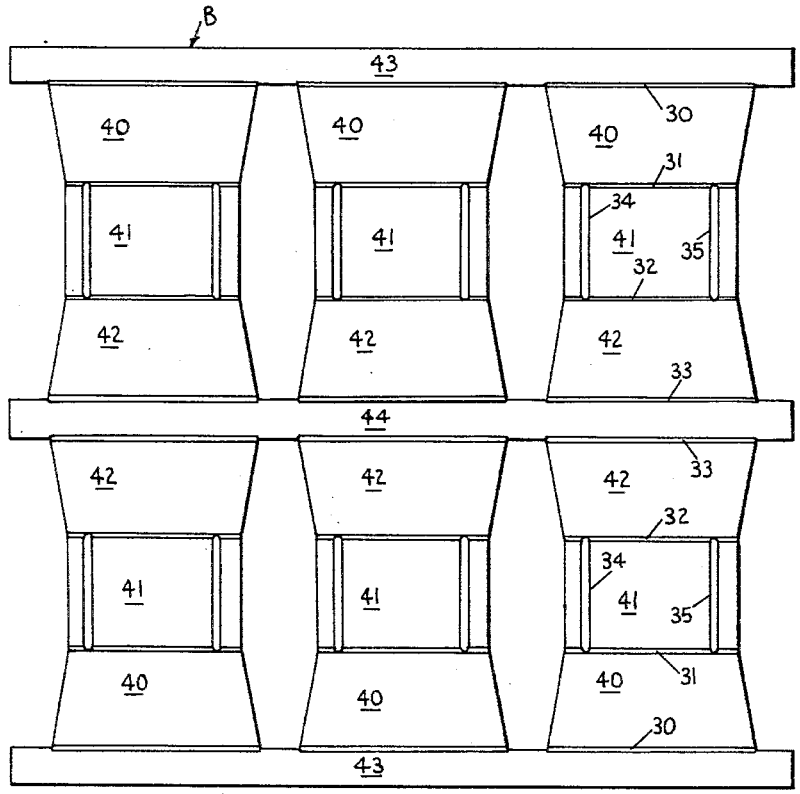
FIGURE 2 is a plan view of a male insert blank.
Figure 4:
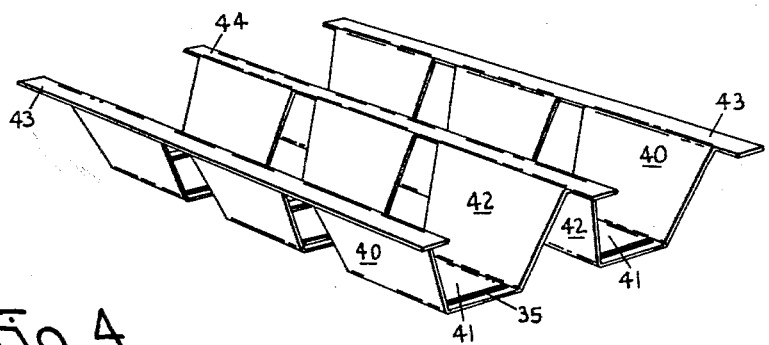
Figure 5:
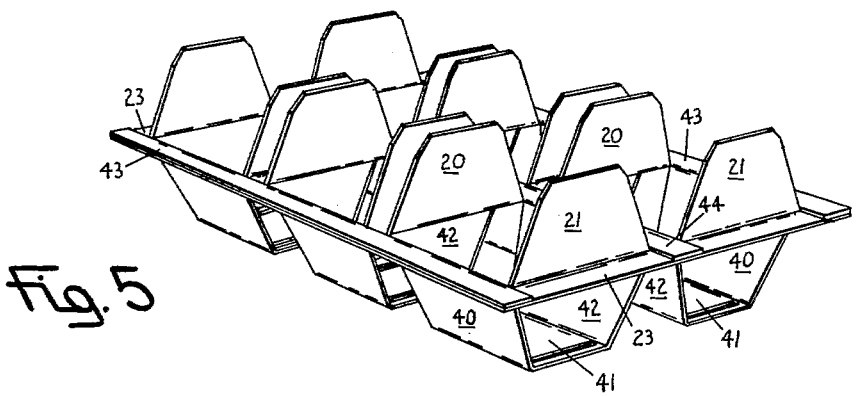
Figure 6:
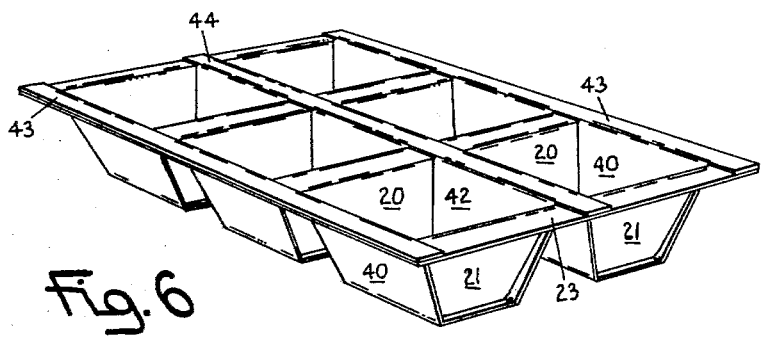
Figure 7:
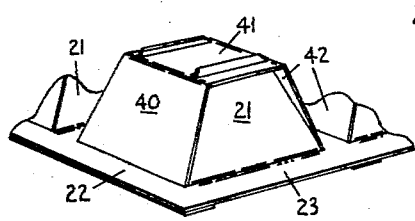

FIGURE 3 is a fragmentary perspective view of the blank of FIGURE 1 folded for reception of the male insert, FIGURE 4 is a fragmentary perspective of the blank of FIGURE 2 folded for insertion in the openings of the female blank, FIGURE 5 is a fragmentary perspective view of the tray according to the present invention with the male blank inserted in the female blank to form compartments or pockets, FIGURE 6 is a perspective view of the completed tray, and FIGURE 7 is a fragmentary perspective view of the bottom of the completed tray.

Referring to FIGURES 1 and 2, the tray is formed from two blanks, A and B. Blank A, shown in FIGURE 1, is preferably made of paperboard and constitutes the female tray forming portion of the tray. Blank A is divided by score lines 10 and 11 and cut lines 12 into main panel portions 22–25 and flaps 20 and 21 hingedly connected to main panel portions 23 and 25. Blank B, shown in FIGURE 2, also is preferably made of paperboard and constitutes the male pocket forming portion of the tray. Blank B is divided by score lines 30–33 into hingedly connected panels including side panels 40, 42, bottom panels 41, edge panels 43 and center panels 44. Bottom panels 41 contain slits 34 and 35 for engagement of flaps 20 and 21 as will be described more fully hereinafter. As is obvious from a comparison of FIGURES 1 and 2, blank B is larger in its lateral dimension than blank A. Therefore, in order for the edge panels 43 of blank B to coincide with the main panel portions 22 of blank A in the completed tray shown in FIGURE 6, it is necessary for blank B to be reduced in size by an accordion type of folding. The actual folding will be described hereinafter with reference to the insertion of blank B into blank A.

The blanks A and B of FIGURES 1 and 2, respectively, are formed into the configurations shown in FIGURES 3 and 4, prior to combining them to form the divided tray. In blank A side flaps 20 and 21 are folded upwardly about score lines 10 and 11, respectively, to the position shown in FIGURE 3. The initial folding and the subsequent holding in position of the panels and flaps can be readily accomplished by seating the blank over a male die at least coextensive in area with the outer perimeter of the blank. The openings in the blank correspond to the projections on the die.

Blank B is formed into the configuration shown in FIGURE 4 by depressing bottom panels 41, causing edge panels 43 to be drawn closer together. In FIGURE 4 edge panels 43 and center panel 44 lie in the same plane with bottom panels 41 in a separate, parallel plane. Side panels 42 are hinged to bottom panels 41 along score lines 32 and to center panel 44 along score lines 33, and are positioned at an angle to the bottom panels as are side panels 40 hinged along score lines 31 to bottom panels 41 and along score lines 30 to edge panels 43. The folding of blank B can be performed by positioning the blank over a female die and depressing the pocket forming portions into the female die with a second male die having projections essentially equal in configuration to the cavities in the female die. A vacuum is then drawn through the walls of the projections of the second male die holding the blank in the configuration shown in FIGURE 4.

Next, blank B is positioned over blank A and the pocket forming portions inserted downwardly into the openings in blank A. As shown in FIGURE 5 the center and edge panels of blank B lie superposed on the respective main panel portions of blank A. After insertion of the pocket forming portions, the vacuum drawn through the walls of the projections in the second male die is released and the die withdrawn. The tray is completed by depressing flaps 20 and 21 so that the lower edges of the flaps engage in locking relationships with slits 34 and 35. FIGURE 6 shows the completed tray. The bottom of the tray is shown in FIGURE 7 further depicting the locking construction of the pockets.

Although it is obvious that other locking configurations can be employed, the embodiment shown is particularly advantageous since the side edges of flaps 20 and 21 abut side panels 40 and 42 maintaining the rigid configuration of the pockets.

If it is desired to utilize the completed tray for the baking of the contents packaged therein, it is necessary to employ a lining material, such as foil, to prevent burning or scorching of the contents. Both of the blanks A and B employ a layer of foil on the upper surfaces thereof for baking purposes. The use of the board foil combination eliminates the burning or scorching encountered when board alone is used and the uneven baking when foil alone is employed.

The present invention provides a rigid tapered tray which can be stacked for shipment in a nested condition. Employment of reinforced pockets separated from each other prevents product shifting and provides essential siftproofness for the contents. The tray can readily be rendered completely siftproof if desired by coating or lining the interior and by the employment of a proper lining material be used for baking of the contents packaged therein. Although exemplified with six pockets it is understood that the size and shape of the tray may be varied as desired without departing from the scope of this invention.

I claim:

1. A multi-compartment, nestable tray comprising an upper planar panel connecting a plurality of separate tapered cup-like receptacle portions extending downwardly from said upper panel, each of said receptacle portions having a pair of opposed side panels inclined downwardly and inwardly toward each other with the side edges of each side panel tapering towards each other, said side panels being connected to said upper panel along a pair of hinge lines and to an intervening bottom panel; said bottom panel having a pair of slits each adjacent and parallel to one of the side edges of said bottom panel transverse to the hinge connections thereof, said pair of slits being spaced apart a lesser distance than said hinge lines connecting the side panels to the upper panel; a pair of opposed flaps inclined downwardly and inwardly and transverse to said side panels hingedly dependent from said upper panel and having their lower edges inserted in locking engagement in said slits and their side edges in frictional contact with the inclined surfaces of said side panels.

2. The tray of claim 1 wherein the side edges of said opposed flaps are in frictional contact with the side edges of said side panels.

References Cited by the Examiner

UNITED STATES PATENTS

| | | | |
|---|---|---|---|
| 2,483,583 | 10/49 | Holes | 229—28 |
| 3,055,573 | 9/62 | Carter | 229—34 |

GEORGE O. RALSTON, *Primary Examiner.*

FRANKLIN T. GARRETT, *Examiner.*